June 30, 1936. M. N. FAIRBANK 2,046,154
VIBRATION MEASURING AND INDICATING DEVICE
Filed July 21, 1934 4 Sheets-Sheet 2

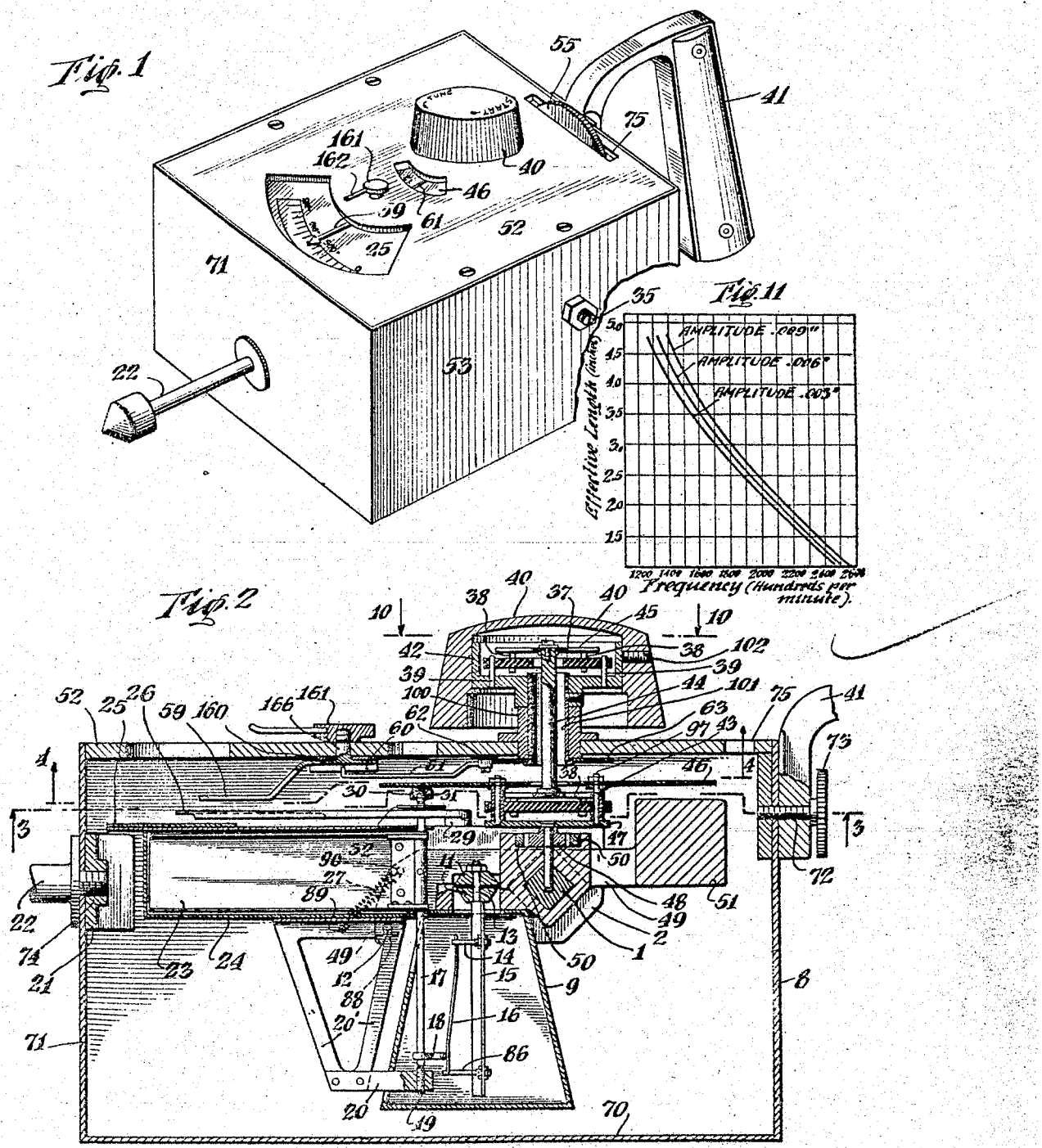

INVENTOR
Murry N. Fairbank
BY Hoguet, Neary
ATTORNEYS

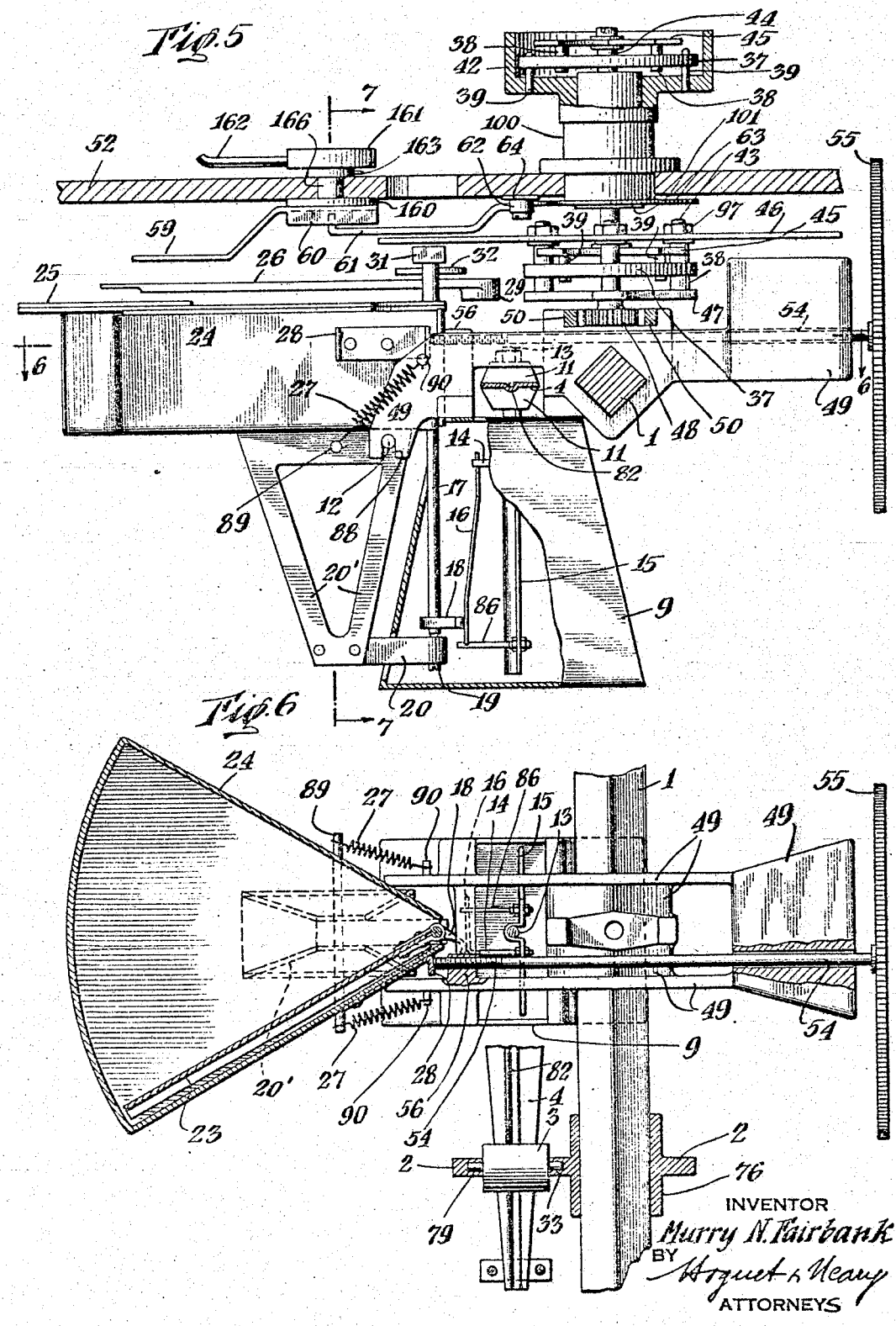

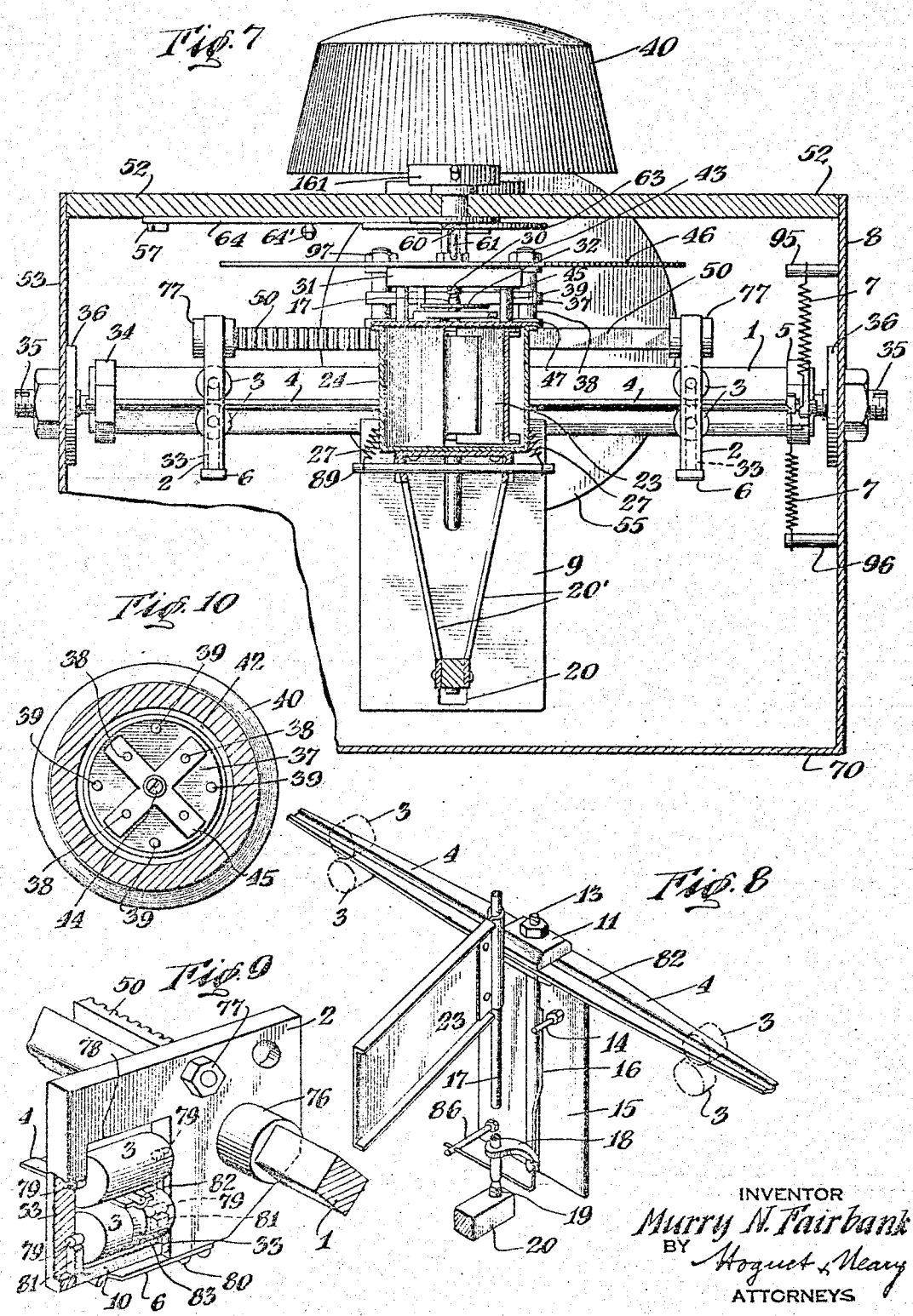

Patented June 30, 1936

2,046,154

UNITED STATES PATENT OFFICE 2,046,154

VIBRATION MEASURING AND INDICATING DEVICE

Murry N. Fairbank, Suffolk County, N. Y.

Application July 21, 1934, Serial No. 736,435

17 Claims. (Cl. 73—51)

This invention relates in general to measuring instruments and more particularly to instruments for measuring the components of vibratory movement of a vibrating mass.

An object of the invention is to provide a device for measuring and indicating the amplitude of vibration and the period, or frequency, of bodies having a regular and reasonably steady vibratory motion.

Another object is to provide an improved means for adjusting and maintaining the device in a state of resonance with the vibrations of the body the motion of which it is desired to measure.

Another object of the invention is to provide a device for measuring the vibratory movements of an object in any one of a number of planets. Inasmuch as a body may vibrate in one or more directions it is an object of this invention to provide a device for measuring each of these components of movement separately. In other words, it is an object of this invention to provide a device which will be sensitive along only one axis or in one direction at a time and be independent of and not sensitive to vibrations other than those along the particular chosen axis.

It is a further object of the invention to provide such a measuring device that it may be portable and hand-held against or fastened to the vibrating body, the relative position of the device with the body depending upon the particular component of vibrating movement being measured.

With these and other ends in view it is proposed to provide a device in the form of a self contained portable unit. The unit includes a vibratory member and associated members so arranged that the natural period of vibration of the vibratory member may be easily adjusted to any desired value within a predetermined range. The unit is to include a device for indicating the amplitude of motion of the vibratory member on a conveniently located scale. The unit is also to include a device for applying to the frequency scale of the vibratory assembly a correction for different amplitudes of motion of the vibrating body.

With the foregoing and other objects in view, the invention consists in the combination of parts and in the details of construction hereinafter set forth in the following specification and appended claims, certain embodiments thereof being illustrated in the accompanying drawings, in which:

Fig. 1 is a view in perspective of the device in its casing.

Fig. 2 is a view in longitudinal section taken along line 2—2 of Fig. 3 through the device as shown in Fig. 1.

Fig. 5 is a view in section taken along line 5—5 of Fig. 3.

Fig. 6 is a view in section taken along line 6—6 of Fig. 5.

Fig. 7 is a view in section taken along line 7—7 of Fig. 5.

Fig. 8 is an enlarged detail view in perspective of the vibratory member, the spring and the vane.

Fig. 9 is an enlarged detail view in perspective of the torsional spring and the adjustable carriage for varying its effective length.

Fig. 10 is an enlarged detail view of a resilient coupling for the frequency adjusting control.

Fig. 11 is a diagrammatical showing of the relationship of a medium amplitude with various frequencies.

Figure 3:
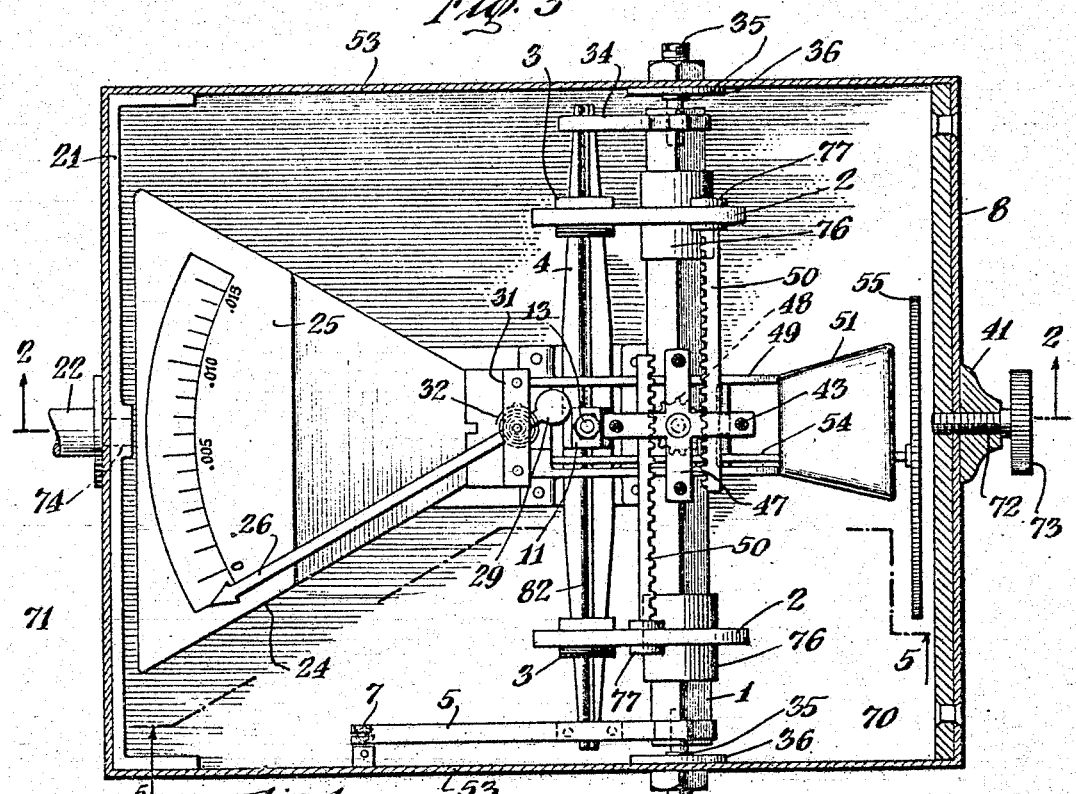
Fig. 3 is a view in section taken along line 3—3 of Fig. 2.

Referring more particularly to the drawings, Fig. 1 shows the self-contained unit assembled. The casing consists preferably of a light metal box with side walls 53, a bottom wall 70, a removable top plate 52 and front and rear end walls 71 and 8 respectively. To the rear wall 8 there may be secured an arm and hand pistol grip 41 by means of a screw bolt 72 provided with a knurled hand knob 73. The box is of such light weight that it may be readily hand-held by gripping the pistol grip. In the front wall there is provided an internally screw threaded beam 74 extending across the front wall of the case and receives a prong 22, which latter may be either manually pressed against the vibrating body to be investigated or suitably secured thereto.

The top plate 52 is slotted at two spaced intervals to render visible an amplitude scale 25 and a frequency scale 46. The top plate is also slotted at 75 to allow a rotatable manual adjustment wheel 55 to protrude upwardly therethrough. Knob 40 is a control knob for manual adjustment of the frequency scale indicator.

The vibratory system as a unit is carried by a bar 1 of substantially square cross-section and this bar is apertured at its ends to receive the non-threaded shanks of set screws 35 extending through the casing side walls and reinforcing blocks 36 secured thereto, the fit between the shanks and the apertures of the bar being such as to permit rotation of the bar and the assembly carried thereby.

A pair of sliders 2 are each apertured to receive a bearing sleeve 76 for sliding engaged with bar 1 upon which the sliders are mounted. Each of these sliders has secured thereto at 77 a toothed rack 50. The racks extend from each slider in opposite directions but parallel and in the same horizontal plane. The racks simultaneously engage a pinion 48, under the control of hand knob 40, for simultaneously moving the sliders either toward or away from each other according to the direction in which the knob is rotated. In order to provide for a wide range of relative movement between the sliders each of the same is perforated to allow the free end of the rack of the other to pass through the perforation. The guide bar 1 passes through a centrally located rigid frame 49 so as to be fixed thereto. Each slider carried thereby is recessed at 78, the side walls of the recesses each being formed with a groove 33. A pair of rollers 3 is carried in each recess 78, the rollers each being provided at each end with stems 79 which engage the slots 33. The rollers are rotatable and are vertically slidable into place and are held in place by plates 10 with upstanding lugs 81, the plates 10 each being urged upwardly and consequently the lower rollers moved upwardly by a leaf spring 6 secured at one end at 80 to the bottom of the slider. These rollers are adapted to snugly but rotatably engage in torsional substantially flat spring 4.

The flat spring 4 is preferably corrugated at 82 and the roller 3 is provided with a corresponding groove 83 to receive the corrugation. This spring 4 is widest at its center portion and is clamped between blocks 11 near its central portion. The outer ends of the flat spring 4 are retained by arms 34 and 5 and carried by the guide bar 1. The two small blocks are screwed securely to the upper end of a short rod 13 and to this rod is fastened a metal vane or paddle 15. This rod and paddle may be considered as one piece and in combination with the torsional spring 4 form the vibratory member of the assembly.

As the lower end of the paddle 15 is displaced in a fore and aft direction, or, in other words, perpendicular to the face of the paddle, the torsional spring 4 secured thereto will accordingly be twisted about its longitudinal axis. This resulting torsion in spring 4 causes a returning force to be exerted on the paddle, causing the latter to swing in an opposite direction. Thus the paddle is capable of a swinging vibratory motion about the longitudinal axis of torsional spring 4 as a center. The action of the paddle is similar to that of a pendulum except that in a pendulum gravity is the only force acting against the impressed displacing force, while with the present arrangement the force of gravity is substantially supplemented by the torsion in the spring. The force required to produce a given angular displacement of paddle 15 and the angle of twist in the torsional spring 4 about its longitudinal axis depends upon the length of the spring and is exposed to such torsion. Since the rollers carried by each slider grip the spring 4 resiliently but firmly, only that part of the spring between the two sliders will be twisted. Thus as the sliders are moved towards each other the acting or effective length of the spring will accordingly be shortened and the force required to displace the paddle and twist the spring is accordingly increased. On the other hand, by moving the sliders away from each other and consequently lengthening the effective section of the spring therebetween, the force required to produce the same displacement will be appreciably reduced. The spring 4 is also tapered in width towards its ends in order to provide a wider range of torsion values for a given change of length of spring than would be possible with a spring of constant width. As previously explained, this effective length of the spring 4 is varied by the turning of a gear 40 which engages the racks 50 of the two sliders in order to move them either toward each other or away from each other.

When this assembly is subjected to a steady vibratory motion in the plane of spring 4 having a direction perpendicular to its longest axis the paddle 15 swings back and forth with a longitudinal axis of the spring 4 as a center. Since the natural period of oscillation of paddle 15 is determined by the effective length of spring 4 between the two sliders, these two sliders may be moved part or towards each other until the natural period of the vibratory system is the same as that of the vibration of the body which is impressed on the prong 22. When so adjusted the paddle will swing in resonance with the impressed vibration. In this connection the well known strengthening or reinforcing phenomenon of resonance takes place and the amplitude of the swing of the paddle 15 is considerably amplified as compared to that of the impressed vibration.

The natural period for a given amplitude swing of the vibrating system is determined by the effective length of spring 4 between the sliders. Since this effective length may be varied by moving the sliders relatively to each other, it follows that the period or frequency of vibration of the paddle may be varied by so moving the sliders. Moreover, for a given angle of displacement or swing of paddle 15 and a given frequency of vibration the relative position of the sliders will always remain the same. This being so, it is possible to calibrate the vibration impressed on the system in terms of frequency by using the distance between the sliders as a measure. This distance is conveniently indicated by means of the scale 46 and the registry of a wire arm 61 thereupon. The circular scale 46 is arranged to turn as the pinion 48 is rotated by means of the knob 40.

For a typical form of spring 4 and paddle 15 the relationship between the natural period of the system and the effective length of spring 4 or distance between the sliders is shown by the curves plotted in Figure 11 in which three curves are shown. The left hand curve shows the relationship when the paddle has a relatively small swing. In the middle curve the angle of swing is twice as great and in the right hand curve the swing is three times as great. It will thus be seen that the relationship between the natural period of the system and the distance between the sliders is not absolute. In using the distance between the sliders as a measure of the natural period, consideration is to be taken of the amplitude of swing of paddle 15. The system may be calibrated for frequency using a given amplitude and suitable corrections applied to the scale thus obtained will give true frequencies for other amplitudes.

A maximum amplitude of swing attained by paddle 15 when adjusted to resonance depends upon the accelerations imparted to it by the impressed vibrations. Assuming a given frequency, the accelerations imposed are a function of the amplitude of the impressed vibration and hence the amplitude of swing of the paddle when adjusted to resonance with the vibration of the body is a measure of the amplitude of the vibration that is causing its motion.

It has been found desirable to dampen the motion of paddle 15 and this may be accomplished by enclosing the paddle in a casing 9 which is fastened at its upper end to the rigid frame 49. This casing serves to confine the air about the paddle, there being small clearances provided between the paddle and sides and bottom of the casing to permit movement of the paddle. The top of the casing 9 is substantially closed partly by the frame 49 and partly by the spring 4. The front and back ends of the casing 9 are at such a distance from the paddle that the latter may swing freely without touching the casing. The air thus restricted within this closure acts as a dampening medium upon paddle 15. As previously stated, the spring 4 is clamped at one end to a long arm 5 rigidly carried by the guide bar 1. At its other end, the spring 4 is slidably fitted in a yoke 34 also carried by the guide bar 1. The yoke prevents spring 4 from moving toward or away from the guide bar but allows endwise motion resulting from expansion or contraction of the spring.

In order to obtain a reading of the amplitude of swing of the paddle 15 on the scale 25, the paddle has secured thereto a small protruding boss 14. Extending downwardly from the boss 14 in front of paddle 15 is a light resilient striker 16 which is shown in Figure 8 as consisting of a small piece of wire. The form and strength of this striker depends upon the range of frequency at which it is to work. This small piece of wire extends between the boss 14 and a boss 86 also secured to the paddle. When the paddle is at rest the striker 16 has pressed against it a short angular arm 18 fastened near the lower extremity of the vertical shaft 17. This arm 18 is curved and so shaped that the striker 16 always hits it squarely or, in other words, perpendicular to a tangent as the arm 18 rotates with the shaft 17. Near the upper end of shaft 17 is secured a light vane 23 above which is carried an indicating needle 26 provided with a counterbalance 29. Above the needle is a hair spring 32 which returns needle 26 to a predetermined position and keeps the arm 18 in contact with striker 16. The vane 23 fits fairly snugly within the sector shape casing 24 with small clearances provided between all of the edges of the vane and the casing. This arrangement serves to restrict the passage of air about the vane 23 so as to dampen its motion. When the paddle 15 swings towards the arm 18 the striker 16 pushes the arm 18 in front of it thereby moving the needle 26 through the medium of shaft 17 against the action of the hair spring 32. As the paddle 15 swings away from arm 18 the weak force of the hair spring and the high dampening effect of vane 23 in its casing do not permit the arm 18 to follow the striker 16 in the return movement and hence the arm 18 stays in substantially the same position until it is engaged on the next swing of the paddle 15. Thus the needle 26 serves to show the extreme position reached by the paddle 15 as it swings forward towards the end wall 71 of the casing. Attached to the cover of the casing 24 is an amplitude scale 25 and an arch 31 which carries a screw 30 into which fits the upper end of the vertical shaft 17. The lower end of the shaft 17 turns in a bearing screw 19 carried by a block 20 with upstanding legs 20' secured thereto. These legs are fastened to the bottom surface of the casing 24. Running through the two legs nearest the guide bar and in a direction parallel to spring 4 is a pin 12 which fits snugly into shallow vertical slots 88 of a forked member of the rigid frame 49. There is also arranged a pin 89 extending through the legs 20' and between this pin 89 and pin 90 on the frame extends a pair of tension springs 27, one on either side of the casing 24. The entire casing assembly is thus held in these two slots 88 of the frame by means of the springs 27, and the lower ends of the springs 27 are connected to a pin 89 which is approximately level with pin 12 while the other pins 90 on the frame are located at a point well above the retaining slots 88. The springs when so placed not only pull upward to hold the pin 12 in its slots but also tend to turn the casing assembly clockwise about the pin 12 as viewed in Fig. 2. This causes the lug 28 on casing 24 to press against the end of a rod 54 which is threaded to engage the block 56. This rod is fixed to a manually rotatable wheel 55 extending upwardly through the slot 75 of the top 52 of the casing. As this rod 54 is rotated the lug 28 is caused to move forward or backward a small distance against or with the pull of the springs 27 and this results in a slight rocking movement of the assembly, including the casing 24, about the pin 12, the object being to provide a means of moving the arm 18 toward or away from the striker 16. When the paddle 15 is at rest it is desired that the needle 26 be over a zero position on scale 25. Since the position of the needle 26 depends upon the relative positions of striker 16 and arm 18 the turning of the wheel 55 and the resulting rotation of the rod 54 provides the desired adjustment. In order to counterbalance the weight of the amplitude indicating assembly and sliders and bring the center of gravity of the entire mechanism to the axis of guide bar 1, the frame 49 is extended rearwardly towards the end plate 8 to form a counterbalance weight 51.

The mounting for the assembly as described consists of a light metal case for supporting, enclosing and protecting the mechanism and transmitting to the mechanism the desired vibratory motion of the body being investigated. There is also provided a rotatable hand knob for turning the pinion 48 to adjust the racks for varying the effective length of the torsional spring. As previously explained, the projection 22 serves only to connect the beam 21 with the vibrating body and may have any convenient form depending upon whether the instrument is to be hand held in contact with the body or fastened thereto by other means. The beam 21 also serves to stiffen the front end of the case so that it transmits undiminished the vibratory motion to the sides of the box and to the guide bar through the set screws 35 for mounting the guide bar on the side panels of the casing. As previously described, this axis of rotation of the guide bar about the set screws passes through the center of gravity of the suspended mechanism. Hence the mechanism will have no tendency to rotate about these pivots inasmuch as it will be normally self-balanced. In order, however, to retain the mechanism approximately in its desired position within the case and prevent its turning far enough to touch the top or bottom of the case, small coil springs 7 may be provided so as to have one end of each attached to the end of the arm 5 while the other end of each spring is secured to pins carried by the side walls 53 of the casing. One of these pins 95 is above the arm 5 and the other pin 96 below, so that the springs oppose each other and attempt to hold the arm 5 midway between their outer ends and approximately level with respect to the case.

In providing a means of turning the pinion 48 care is taken not to materially affect any rotational motion that the mechanism may have relative to the case. With this in view the pinion is placed as close as possible to the axis of rotation and is connected with the control knob 40 by means of a short shaft 44. The short shaft is provided with a flexible universal joint at both of its upper and lower ends and this universal joint may consist of a member 47 and having the form of a symmetrical cross which rotates integrally with pinion 48. Fixed on each of the four legs of this cross are upwardly extending pins 43. Riding on these four pins is a flexible disc of fabric or rubber concentric with the pinion 48. The upper ends of pins 43 extend well above the joint assembly as a whole and are connected to the frequency scale at 97 to carry the same. On the other end of shaft 44 is a similarly cross shaped member 45 carrying on each leg a downwardly pointing pin 38. These pins engage the flexible discs 37 at points midway between the upwardly pointing pins 39 and 43 and on an equal radius.

The construction of the upper and lower universal flexible joints is the same, except that the upper flexible disc 37 is provided with a hole at its center portion so that the shaft 44 may pass through it. The cup-shaped member 42 over which the hand knob 40 is fitted, is provided with four upwardly extending pins 39 which pass through and engage the flexible disc. The cup serves to maintain within it the entire upper flexible joint. At its lower end the cup has a collar and sleeve which turn in a bearing 100 secured to the casing top plate 52. Shaft 44 extends loosely through the sleeve 101 to the bottom of which sleeve is secured a cam plate 63. The knob 40 may be fitted over and releasably secured to the cup by means of a set screw 102. The object in allowing the mechanism to rotate slightly within the casing and of balancing statically and preferably dynamically about its axis of rotation provided by the bearing screws 35 is as follows:

The phenomenon within the instrument that is of primary importance is the amplitude of swing of paddle 15 when it is adjusted to resonance with the impressed vibration. The instrument is hand held against or mounted on the vibrating body so that the impressed vibration therefrom, or the component of the vibration that is being measured, has a direction the same as that of the axis of projection 22. In other words, the direction of the impressed vibration is perpendicular to the torsional spring 4 and approximately in the same plane. Therefore, vibratory motions or accelerations in this direction act to cause the paddle 15 to vibrate in the desired manner. Similar forces acting in a vertical direction or in a horizontal direction parallel with the axis of spring 4 will not materially affect the swing or operation of the paddle. However, any rotational forces acting on spring 4 about any axis parallel or nearly parallel to the axis of spring 4 will affect the amplitude of swing of the paddle. This causes the swing to become increased or decreased in length depending upon their relative directions. Such outside rotational forces may arise from vibrations imparted to the hand while holding the instrument. They may also arise from another component of the impressed vibration or from any other action tending to cause one end of the casing to vibrate vertically relative to the other end. The vibratory system is therefore supported on the pivots 35 in the manner described in order to isolate the mechanism from such rotational forces so as to make the device as far as possible a free system. In other words the case may be moved rotatably slightly back and forth without the motion thereof being transmitted to the torsional spring 4 or the swinging paddle 15.

As previously stated, the present invention contemplates the application to the frequency reading on scale 46 the approximate correction necessary for different amplitudes. Assume that the instrument is subjected to a given vibration of medium amplitude and various frequencies. A curve may be plotted to illustrate the effective lengths of the torsional spring 4 that produce resonance in the system for each of the different frequencies. Such a relationship is shown by the middle curve of Fig. 11. Since scale 46 is geared to the two sliders 2 as the effective length of spring 4 is changed by the movement of the sliders, the data used in plotting this curve may be used in calibrating scale 46 directly in terms of frequency, such as, for example, hundreds per minute. The calibration will be correct for the amplitudes used in obtaining it. For smaller amplitudes the curve shifts to the left and for larger amplitudes the curve shifts to the right. The curves also diverge as the frequency increases. If the frequency scale 46 has been calibrated for the medium amplitude represented by the middle curve, the shifting of the curves means that for larger amplitudes the scale will be read too low, and for smaller amplitudes the scale will be read too high. The error will increase with the added frequency as the divergence shows.

Figure 4:
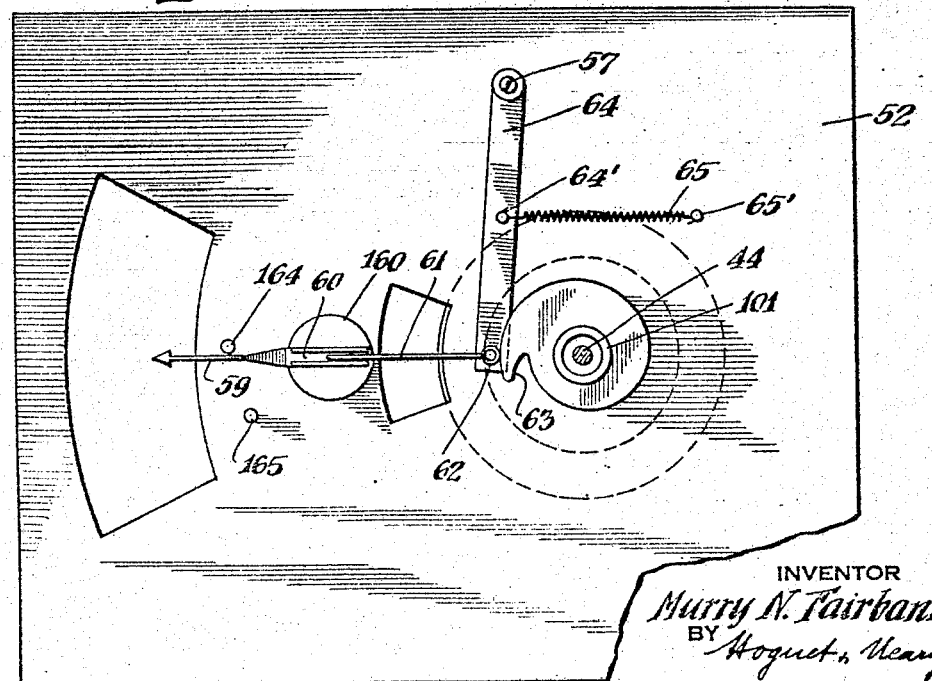
Fig. 4 is a fragmentary view in section taken along line 4—4 of Fig. 2.

Figures 2, 4 and 5 show a simple arrangement for applying approximately the necessary plus or minus correction to the scale as calibrated, so that it will indicate true frequency with different amplitudes. The movable wire arm 61 is used as the reference line against which scale 46 is read for calibration purposes. At its one end the arm 61 is fixed to a cam follower 62 on an arm 64 pivoted at 57 to the underside of the top plate 52. Arm 64 swings in a horizontal plane under the urging of a tension coil spring 65 connected at 64' to the arm and at 65' to the top plate, thus bringing the follower 62 into constant engagement with the surface of the cam plate. The cam plate is fastened to the lower end of the sleeve 101 of the cup 42 so as to be rotated by the hand knob 40. The cam thus has a fixed relationship with the rack actuating pinion 48. The forward end of arm 61 is preferably bent upward to slide freely in a slot 69 arranged in a box 160 rotatable with a hand knob 161. The knob 161 may be adjustably mounted on a shaft 166 by means of a set screw 163. The shaft 166 turns integrally with box 160 so that the knob 161 may be turned and the indicator 59 accordingly turned to a desired position. Two screws 164 and 165 may be screwed to the top plate of the casing and extend downwardly sufficiently to positively limit the pivotal movements of the indicator 59 rigidly carried by the box 160.

In the position shown in Figure 4 the pointer 59 is set to indicate a medium amplitude on the amplitude scale 25 which is the same as that with which the frequency calibration has already been obtained. In other words, pointer 59 in this position has been set directly from the reading obtained from the amplitude needle 26 in Figure 2. Inasmuch as the frequency scale has already been calibrated at this particular altitude no corrections are necessary. Therefore in this position the slot 60 in the plate 160 is parallel to the arm 61. For larger amplitudes the frequencies indicated by scale 46 will be inaccurate and will be too low. The correct frequency may be obtained and indicated by swinging the reference arm 61 in a counterclockwise direction the proper distance before taking the reading on scale 46. This is accomplished by turning the knob 161 and consequently turning the pointer 59 and also the slot 60 in a clockwise direction until the pointer 59 registers on the scale 25 the same amplitude shown by the needle 26. In such a position the slot 60 is not parallel to the reference arm 61. The end of arm 61 which slides in the slot 60 will thus be carried in a counterclockwise direction. The distance it is so carried depends upon the displacement of the forward end of arm 61 from the vertical rotation axis of the slot 60. This displacement is determined by the contour of the cam inasmuch as the follower 62 in its engagement with the cam controls the movement of the arm 61. The cam is preferably so shaped that as it turns with the scale 46 to positions corresponding to higher frequencies the end of reference arm 61 is withdrawn from the axis of slot 60 and the correction applied by the swinging of pointer 59 is increasingly greater. For amplitudes smaller than the one used in calibration the action of the correcting device is similar but pointer 59 is moved in a counter-clockwise direction so as to cause the reference arm 61 to be carried in an opposite direction, resulting in the production of a minus correction on the scale 46.

I claim:

1. In an instrument for measuring and indicating the amplitude and frequency of vibration of a given object, a self-contained unit including a case and mechanism rotatably suspended therein, said mechanism including an oscillatory member responsive to the vibration of said object, a non-vibratory indicator and means for intermittently connecting the same to said oscillatory member for measuring and indicating the amplitude of vibration thereof and of said object, an indicator connected to said oscillatory member for measuring and indicating the frequency of vibration thereof and of said object, hand controlled means for adjusting the frequency of swing of said oscillatory member and for bringing the vibration thereof into resonance with that of said given object, said means including a flexible connection between said mechanism and the exterior of said case.

2. In an instrument for measuring and indicating the amplitude and frequency of vibration of a given object, a self-contained unit including an oscillatory member responsive to the vibration of said object, an indicator connected to said oscillatory member for measuring the amplitude of vibration thereof and of said object, an indicator connected to said oscillatory member for measuring the frequency of vibration thereof and of said object, hand controlled means for adjusting the frequency of swing of said oscillatory member and for bringing the vibration thereof into resonance with that of said given object, and a manually operated correction device for said frequency indicator a portion of which is adapted to be moved so as to coincide with the reading of said amplitude indicator to give a plus or minus frequency correction for amplitudes other than that at which said frequency indicator is calibrated, said device including a pointer carried by a variable excentric, said excentric being operatively connected to said frequency indicator.

3. In an instrument for measuring and indicating the amplitude and frequency of vibration of a given object, a self-contained unit including a case, a bar laterally pivotally suspended by said case, a mechanism including a frame carried by said bar so as to be self-balanced thereon, said mechanism including a torsional spring parallel to said bar and connected at its ends to said frame, a paddle inclosed in a casing secured to the frame, said paddle being connected at its upper end to said torsional spring and adapted to twist the same when the paddle swings in a direction perpendicular to the axis of the torsional spring in response to the vibrations of said object impressed on said case, a rotary shaft connected to said frame, a second casing, an amplitude scale and a vane and pointer carried by said casing, said pointer and vane being rotatable in unison therewith, an arm carried by said shaft, a resilient member carried by said paddle adapted to engage said arm to impart rotary motion through said shaft to said vane and pointer against the action of a return hair spring secured to said pointer and the frame, said second casing being rotatably manually adjustable about an axis parallel to said bar for adjusting the position of said arm relative to said paddle, a pair of sliders fitted with spring pressed rollers engaging the upper and lower faces of said torsional spring, said sliders carrying racks, a pinion for engaging said racks, a manual control knob, said pinion being connected to said manual control knob for moving said sliders toward or away from each other to vary the effective length of said torsional spring, a scale operated by said knob for indicating the frequency of vibration in terms of distance between the adjusted sliders and the consequently varied effective lengths of the torsional spring between the sliders as the frequency of vibration of the paddle is brought into resonance with that of the given object, a correction device comprising a control knob and a pointer overlapping said amplitude scale, a cam plate rotated by said frequency adjuster knob, a follower for said cam plate, a reference wire pivotally connected to said follower and pivotally and slidably connected to said last named pointer, means including said control knob for bringing said pointer and the amplitude pointer into coincidence, said reference wire being adapted to move as a result of such adjustments relative to the frequency scale to form a basis of comparison for correction purposes between the original reading and the varied position of the reference wire with respect to the frequency scale, said frequency scale and said pinion being connected to and driven by the frequency adjustment control knob through the medium of flexible universal joints.

4. In an instrument for measuring and indicating the amplitude and frequency of vibration of a given object, a self-contained unit including a case, a bar laterally pivotally suspended by said case, a mechanism including a frame carried by said bar so as to be self-balanced thereon, said mechanism including a torsional spring parallel to said bar and connected at its ends to said frame, a paddle inclosed in a casing secured to the frame, said paddle being connected at its upper end to said torsional spring and adapted to twist the same when the paddle swings in a direction perpendicular to the axis of the torsional spring in response to the vibrations of said object impressed on said case, a rotary shaft connected to said frame, a second casing, an amplitude scale and a vane and pointer carried by said casing, said pointer and vane being rotatable in unison therewith, an arm carried by said shaft, a resilient member carried by said paddle adapted to engage said arm to impart rotary motion through said shaft to said vane and pointer against the action of a return hair spring secured to said pointer and the frame, said second casing being rotatably manually adjustable about an axis parallel to said bar for adjusting the position of said arm relative to said paddle, a pair of sliders fitted with spring pressed rollers engaging the upper and lower faces of said torsional spring, said sliders carrying racks, a pinion for engaging said racks, a manual control knob, said pinion being connected to said manual control knob for moving said sliders toward or away from each other to vary the effective length of said torsional spring, a scale operated by said knob for indicating the frequency of vibration in terms of distance between the adjusted sliders and the consequently varied effective lengths of the torsional spring between the sliders as the frequency of vibration of the paddle is brought into resonance with that of the given object, a correction device comprising a control knob and a pointer overlapping said amplitude scale, a cam plate rotated by said frequency adjuster knob, a follower for said cam plate, a reference wire pivotally connected to said follower and pivotally and slidably connected to said last named pointer, means including said control knob for bringing said pointer and the amplitude pointer into coincidence, said reference wire being adapted to move as a result of such adjustments relative to the frequency scale to form a basis of comparison for correction purposes between the original reading and the varied position of the reference wire with respect to the frequency scale.

5. In an instrument for measuring and indicating the amplitude and frequency of vibration of a given object, a self-contained unit including a case, a bar laterally pivotally suspended by said case, a mechanism including a frame carried by said bar so as to be self-balanced thereon, said mechanism including a torsional spring parallel to said bar and connected at its ends to said frame, a paddle inclosed in a casing secured to the frame, said paddle being connected at its upper end to said torsional spring and adapted to twist the same when the paddle swings in a direction perpendicular to the axis of the torsional spring in response to the vibrations of said object impressed on said case, a rotary shaft connected to said frame, a second casing, an amplitude scale and a vane and pointer carried by said casing, said pointer and vane being rotatable in unison therewith, an arm carried by said shaft, a resilient member carried by said paddle adapted to engage said arm to impart rotary motion through said shaft to said vane and pointer against the action of a return hair spring secured to said pointer and the frame, said second casing being rotatably manually adjustable about an axis parallel to said bar for adjusting the position of said arm relative to said paddle, a pair of sliders fitted with spring pressed rollers engaging the upper and lower faces of said torsional spring, said sliders carrying racks, a pinion for engaging said racks, a manual control knob, said pinion being connected to said manual control knob for moving said sliders toward or away from each other to vary the effective length of said torsional spring, a scale operated by said knob for indicating the frequency of vibration in terms of distance between the adjusted sliders and the consequently varied effective lengths of the torsional spring between the sliders as the frequency of vibration of the paddle is brought into resonance with that of the given object.

6. In an instrument for measuring and indicating the amplitude and frequency of vibration of a given object, a self-contained unit including a case, a bar laterally pivotally suspended by said case, a mechanism including a frame carried by said bar so as to be self-balanced thereon, said mechanism including a torsional spring parallel to said bar and connected at its ends to said frame, a paddle inclosed in a casing secured to the frame, said paddle being connected at its upper end to said torsional spring and adapted to twist the same when the paddle swings in a direction perpendicular to the axis of the torsional spring in response to the vibrations of said object impressed on said case, a rotary shaft connected to said frame, a second casing, an amplitude scale and a vane and pointer carried by said casing, said pointer and vane being rotatable in unison therewith, an arm carried by said shaft, a resilient member carried by said paddle adapted to engage said arm to impart rotary motion through said shaft to said vane and pointer against the action of a return hair spring secured to said pointer and the frame, said second casing being rotatably manually adjustable about an axis parallel to said bar for adjusting the position of said arm relative to said paddle, a pair of sliders fitted with spring pressed rollers engaging the upper and lower faces of said torsional spring, said sliders carrying racks, a pinion for engaging said racks, a manual control knob, said pinion being connected to said manual control knob for moving said sliders toward or away from each other to vary the effective length of said torsional spring, a scale operated by said knob for indicating the frequency of vibration in terms of distance between the adjusted sliders and the consequently varied effective lengths of the torsional spring between the sliders as the frequency of vibration of the paddle is brought into resonance with that of the given object, said frequency scale and said pinion being connected to and driven by the frequency adjustment control knob through the medium of flexible universal joints.

7. In an instrument for measuring and indicating the amplitude and frequency of vibration of a given object, a self-contained unit including a case, a bar laterally pivotally suspended by said case, a mechanism including a frame carried by said bar so as to be substantially self-balanced thereon, said mechanism including a torsional spring parallel to said bar and connected at its ends to said frame, a paddle inclosed in a casing secured to the frame, said paddle being connected at its upper end to said torsional spring and adapted to twist the same when the paddle swings in a direction perpendicular to the axis of the torsional spring in response to the vibrations of said object impressed on said case, a rotary shaft connected to said frame, a second casing, an amplitude scale and a vane and pointer carried by said casing, said pointer and vane being rotatable in unison therewith, an arm carried by said shaft, a resilient member carried by said paddle adapted to engage said arm to impart rotary motion through said shaft to said vane and pointer against the action of a return hair spring secured to said pointer and the frame, said second casing being rotatably manually adjustable about an axis parallel to said bar for adjusting the position of said arm relative to said paddle, a pair of sliders fitted with spring pressed rollers engaging the upper and lower faces of said torsional spring, said sliders carrying racks, a pinion for engaging said racks, said pinion being connected to a manual control knob for moving said sliders toward or away from each other to vary the effective length of said torsional spring.

8. In an instrument for measuring and indicating the amplitude and frequency of vibration of a given object, a self-contained unit including a case, a bar laterally pivotally suspended by said case, a mechanism including a frame carried by said bar so as to be substantially self-balanced thereon, said mechanism including a torsional spring parallel to said bar and connected at its ends to said frame, a paddle inclosed in a casing secured to the frame, said paddle being connected at its upper end to said torsional spring and adapted to twist the same when the paddle swings in a direction perpendicular to the axis of the torsional spring in response to the vibrations of said object impressed on said case, a rotary shaft connected to said frame, a second casing, an amplitude scale and a vane and pointer carried by said casing, said pointer and vane being rotatable in unison therewith, an arm carried by said shaft, a resilient member carried by said paddle adapted to engage said arm to impart rotary motion through said shaft to said vane and pointer against the action of a return hair spring secured to said pointer and the frame, said second casing being rotatably manually adjustable about an axis parallel to said bar for adjusting the position of said arm relative to said paddle, a pair of sliders fitted with spring pressed rollers engaging the upper and lower faces of said torsional spring, said sliders carrying racks, a pinion for engaging said racks, said pinion being connected to a manual control knob for moving said sliders toward or away from each other to vary the effective length of said torsional spring, said pinion being connected to and driven by the frequency adjustment control knob through the medium of flexible universal joints.

9. In an instrument for measuring and indicating the amplitude and frequency of vibration of a given object, a self-contained unit including a case, a bar pivotally suspended by said case so as to be substantially self-balanced about its axis of suspension, a mechanism carried by said bar including a frame, a torsional spring parallel to the axis of suspension of said bar and connected at its ends to said frame, a paddle, said paddle being connected to said torsional spring and adapted to twist the same when the paddle swings in a direction perpendicular to the axis of the torsional spring in response to the vibrations of said object impressed on said case, a rotary shaft connected to said frame, an amplitude scale and a vane and pointer rotatable in unison with said shaft, an arm carried by said shaft, a member carried by said paddle adapted to engage said arm to impart rotary motion through said shaft to said vane and pointer against the action of a return spring secured to said pointer and the frame, means for adjusting the position of the axis of said arm relative to said paddle when engaging said arm, means for varying the effective length of said torsional spring, a scale for indicating the frequency of vibration in terms of the varied effective lengths of the torsional spring as the frequency of vibration of the paddle is brought into resonance with that of the given object, a correction device including a pointer overlapping said amplitude scale, means for imparting movement thereto so as to bring said pointer and the amplitude pointer into coincidence, a reference wire connected to said last named pointer and adapted to move as a result of such adjustments relative to the frequency scale to form a basis of comparison for correction purposes between the original reading and the varied position of the reference wire with respect to the frequency scale, said frequency scale and the means for varying the effective length of the torsional spring being connected to and driven by a manual member for effecting the frequency adjustment through the medium of a flexible universal joint.

10. In an instrument for measuring and indicating the amplitude and frequency of vibration of a given object, a self-contained unit including a case, a bar pivotally suspended by said case, a mechanism including a frame carried by said bar so as to be substantially self-balanced thereon, said mechanism including a torsional spring having its ends fixed and extending parallel to the axis of suspension of the mechanism, an oscillatory member including a paddle and fixedly connected to said torsional spring and adapted to twist the same when the oscillatory member swings in a direction perpendicular to the axis of the torsional spring in response to the vibrations of said object impressed on said case, an amplitude scale and a vane and pointer rotatable in unison, means for imparting movement to said vane and pointer by said paddle against the action of a return spring secured to said pointer, means for adjusting said vane and pointer relative to said oscillatory member, means for varying the effective length of said torsional spring, a scale for indicating the frequency of vibration in terms of the varied effective lengths of the torsional spring as the frequency of vibration of the paddle is brought into resonance with that of the given object, a correction device including a pointer overlapping said amplitude scale, means for imparting movement thereto so as to bring said pointer and the amplitude pointer into coincidence, a reference member connected to said overlapping pointer and adapted to move as a result of such adjustments relative to the frequency scale to form a basis of comparison for correction purposes between the original reading and the varied position of the reference member with respect to the frequency scale, said frequency scale and the means for varying the effective length of the torsional spring being connected to and driven by a manual member for effecting the frequency adjustment through the medium of flexible universal joints.

11. In an instrument for measuring and indicating the amplitude and frequency of vibration of a given object, a self-contained unit including a case, a bar pivotally suspended by said case, a mechanism including a frame carried by said bar so as to be substantially self-balanced thereon, a torsional spring parallel to the axis of suspension of said bar and connected at its ends to said frame, a paddle, said paddle being connected to said torsional spring and adapted to twist the same when the paddle swings in a direction perpendicular to the axis of the torsional spring in response to the vibrations of said object impressed on said case, a rotary shaft connected to said frame, an amplitude scale and a vane and pointer rotatable in unison with said shaft, an arm carried by said shaft, a member carried by said paddle adapted to engage said arm to impart a rotary motion through said shaft to said vane and pointer against the action of a return spring secured to said pointer and the frame, means for adjusting the position of said arm relative to said paddle, and means for varying the effective length of said torsional spring.

12. In an instrument for measuring and indicating the amplitude and frequency of vibration of a given object, a self-contained unit including a case, a bar pivotally suspended by said case, a mechanism carried by said bar so as to be substantially self-balanced thereon, said mechanism including a torsional spring having its ends fixed and extending parallel to the axis of suspension of the mechanism, an oscillatory member including a paddle and fixedly connected to said torsional spring and adapted to twist the same when the oscillatory member swings in a direction perpendicular to the axis of the torsional spring in response to the vibrations of said object impressed on said case, an amplitude scale and a vane and pointer rotatable in unison, means for imparting movement to said vane and pointer by said paddle against the action of a return spring secured to said pointer, means for adjusting the relationship of said oscillatory member to said vane and pointer, and means for varying the effective length of said torsional spring.

13. In an instrument for measuring and indicating the amplitude and frequency of vibration of a given object, a self-contained unit including a case, a bar pivotally suspended by said case, a mechanism including a frame carried by said bar so as to be substantially self-balanced thereon, a torsional spring parallel to the axis of suspension of said bar and connected at its ends to said frame, a paddle, said paddle being connected to said torsional spring and adapted to twist the same when the paddle swings in a direction perpendicular to the axis of the torsional spring in response to the vibrations of said object impressed on said case, a rotary shaft connected to said frame, an amplitude scale and a vane and pointer rotatable in unison with said shaft, an arm carried by said shaft, a member carried by said paddle adapted to engage said arm to impart rotary motion through said shaft to said vane and pointer against the action of a return spring secured to said pointer and the frame, means for adjusting the relationship of said paddle to said arm, means for varying the effective length of said torsional spring, a scale for indicating the frequency of vibration in terms of the varied effective lengths of the torsional spring as the frequency of vibration of the paddle is brought into resonance with that of the given object.

14. In an instrument for measuring and indicating the amplitude and frequency of vibration of a given object, a self-contained unit including a case, a bar pivotally suspended by said case, a mechanism carried by said bar so as to be substantially self-balanced thereon, a torsional spring having its ends fixed and extending parallel to the axis of suspension of the mechanism, an oscillatory member fixedly connected to said torsional spring and adapted to twist the same when the oscillatory member swings in a direction perpendicular to the axis of the torsional spring in response to the vibrations of said object impressed on said case, an amplitude scale and a vane and pointer rotatable in unison, means for imparting movement to said vane and pointer by said paddle against the action of a return spring secured to said pointer, means for adjusting the relationship of said oscillatory member to said vane and pointer, means for varying the effective length of said torsional spring, a scale for indicating the frequency of vibration in terms of the varied effective lengths of the torsional spring as the frequency of vibration of the paddle is brought into resonance with that of the given object.

15. In a vibratory system including an oscillatory member, means for indicating the amplitude of motion of said oscillating member, said means including a damped non-vibratory indicating needle intermittently connected by impact with said oscillatory member for maintaining a substantially constant position and consequent reading of the maximum movement of said oscillatory member within a given interval and range of movements.

16. In an instrument for measuring and indicating the amplitude and frequency of vibration of a given object, a self-contained unit including a case, a bar pivotally suspended by said case, a mechanism including a frame carried by said bar so as to be substantially self-balanced thereon, a torsional spring parallel to the axis of suspension of said bar and connected at its ends to said frame, means for varying the length of the effective portion of said spring subjected to torsion, a damped swinging member connected to said torsional spring and adapted to twist the same when the swinging member swings in a plane perpendicular to the axis of said torsional spring in response to the vibrations of said object impressed on said case, an amplitude scale and a non-vibratory damped pointer, said pointer being mechanically actuated by said swinging member, and means for adjusting the zero position of said pointer on said amplitude scale.

17. In an instrument for indicating and measuring the amplitude and frequency of vibration of a given object, a self-contained unit including a case and a vibration responsive mechanism pivotally suspended therein, said mechanism including a vibratory torsional spring, means for varying the effective length of said torsional spring, means for indicating the amplitude of vibration of said spring and of said object, said means including a scale and a non-vibratory indicating needle, and means for indicating the frequency of vibration of said spring, said means including a scale mechanically connected to said spring.

MURRY N. FAIRBANK.